United States Patent
Yang et al.

(10) Patent No.: US 12,147,155 B2
(45) Date of Patent: Nov. 19, 2024

(54) MASK CORRECTION METHOD, MASK CORRECTION DEVICE FOR DOUBLE PATTERNING AND TRAINING METHOD FOR LAYOUT MACHINE LEARNING MODEL

(71) Applicant: UNITED MICROELECTRONICS CORP., Hsinchu (TW)

(72) Inventors: Min-Cheng Yang, Tainan (TW); Chung-Yi Chiu, Tainan (TW)

(73) Assignee: UNITED MICROELECTRONICS CORP., Hsinchu (TW)

( * ) Notice: Subject to any disclaimer, the term of this patent is extended or adjusted under 35 U.S.C. 154(b) by 815 days.

(21) Appl. No.: 17/359,687

(22) Filed: Jun. 28, 2021

(65) Prior Publication Data
US 2022/0373877 A1    Nov. 24, 2022

(30) Foreign Application Priority Data
May 21, 2021    (CN) .......................... 202110557042.5

(51) Int. Cl.
| | |
|---|---|
| *G03F 1/36* | (2012.01) |
| *G03F 7/00* | (2006.01) |
| *G06F 30/27* | (2020.01) |
| *G06N 5/04* | (2023.01) |
| *G06N 20/00* | (2019.01) |

(Continued)

(52) U.S. Cl.
CPC ................ *G03F 1/36* (2013.01); *G03F 7/705* (2013.01); *G03F 7/70516* (2013.01); *G06N 5/04* (2013.01); *G06N 20/00* (2019.01); *G06F 30/27* (2020.01); *G06F 2119/18* (2020.01); *G06F 2119/22* (2020.01)

(58) Field of Classification Search
CPC ........ G03F 1/36; G03F 7/705; G03F 7/70516; G06N 20/00; G06N 5/04; G06F 30/27; G06F 2119/18; G06F 2119/22
USPC ........... 716/53, 54, 55; 430/4, 5; 378/34, 35; 700/98, 120, 121
See application file for complete search history.

(56) References Cited

U.S. PATENT DOCUMENTS

| | | |
|---|---|---|
| 8,397,182 B2 | 3/2013 | Nagahara |
| 10,983,446 B1 * | 4/2021 | Lin ..................... G03F 7/70558 |

(Continued)

FOREIGN PATENT DOCUMENTS

| | | | | |
|---|---|---|---|---|
| CN | 112764316 A | * | 5/2021 | ......... G03F 7/70266 |
| TW | I382282 B | * | 1/2013 | ............... G03F 1/36 |

OTHER PUBLICATIONS

Ao et al., Chinese Patent Document No. CN-111999986-A, published Nov. 27, 2020, 4 pages including abstract and 1 drawing. (Year: 2020).*

*Primary Examiner* — Phallaka Kik
(74) *Attorney, Agent, or Firm* — WPAT, P.C

(57) ABSTRACT

A mask correction method, a mask correction device for double patterning, and a training method for a layout machine learning model are provided. The mask correction method for double patterning includes the following steps. A target layout is obtained. The target layout is decomposed into two sub-layouts, which overlap at a stitch region. A size of the stitch region is analyzed by the layout machine learning model according to the target layout. The layout machine learning model is established according to a three-dimensional information after etching. An optical proximity correction (OPC) procedure is performed on the sub-layouts.

13 Claims, 7 Drawing Sheets

(51) Int. Cl.
    *G06F 119/18*     (2020.01)
    *G06F 119/22*     (2020.01)

(56) References Cited

U.S. PATENT DOCUMENTS

| | | |
|---|---|---|
| 2009/0217224 A1 | 8/2009 | Wiaux et al. |
| 2015/0227666 A1* | 8/2015 | Seo .......................... G03F 1/36 716/55 |
| 2020/0380362 A1* | 12/2020 | Cao .......................... G06N 3/04 |
| 2021/0174562 A1* | 6/2021 | Kursun ................... G06N 3/02 |
| 2021/0397172 A1* | 12/2021 | Slachter .............. G03F 7/70625 |
| 2022/0327364 A1* | 10/2022 | Hunsche ................... G03F 1/36 |
| 2023/0306274 A1* | 3/2023 | Zhao ....................... G06N 3/063 |
| 2023/0244136 A1* | 8/2023 | Moon ....................... G03F 1/36 430/5 |

* cited by examiner

MASK CORRECTION METHOD, MASK CORRECTION DEVICE FOR DOUBLE PATTERNING AND TRAINING METHOD FOR LAYOUT MACHINE LEARNING MODEL

This application claims the benefit of People's Republic of China application Serial No. 202110557042.5, filed May 21, 2021, the subject matter of which is incorporated herein by reference.

BACKGROUND OF THE INVENTION

Field of the Invention

The invention relates in general to a mask correction method, a mask correction device and a training method for a machine learning model, and more particularly to a mask correction method, a mask correction device for double patterning, and a training method for a layout machine learning model.

Description of the Related Art

Photolithography process is an essential process in semiconductor process. During the photolithography process, exposure region and non-exposure region are defined according to the mask layout on the mask, such that the predetermined photoresist layout can be developed on the photoresist layer. During the etching process, circuits can be formed by way of etching according to the photoresist layout. However, the circuits formed by way of etching may have defects such as disconnection, short-circuiting, and bridging, and the mask layout needs to be corrected using optical proximity correction (OPC). The optical proximity correction is used for making the circuits formed by way of etching be consistent with the predetermined circuit pattern as much as possible and be free of defects.

SUMMARY OF THE INVENTION

The invention is directed to a mask correction method, a mask correction device for double patterning, and a training method for a layout machine learning model. The layout machine learning model is trained according to the target layout, the size of a stitch region and a three-dimensional information after etching, such that the stitch region can be set by the layout machine learning model to assure the etching quality of double patterning.

According to one embodiment of the present invention, a mask correction method for double patterning is provided. The mask correction method for double patterning includes the following steps. A target layout is obtained. The target layout is decomposed into two sub-layouts, which overlap at a stitch region. A size of the stitch region is analyzed by a layout machine learning model according to the target layout. The layout machine learning model is established according to a three-dimensional information after etching. An optical proximity correction (OPC) procedure is performed on the sub-layouts.

According to another embodiment of the present invention, a mask correction device for double patterning is provided. The mask correction device for double patterning includes an input unit, a decomposition unit, a layout machine learning model and an optical proximity correction (OPC) unit. The input unit is configured to obtain a target layout. The decomposition unit is configured to decompose the target layout into two sub-layouts, which overlap at a stitch region. The layout machine learning model is configured to analyze a size of the stitch region according to the target layout. The layout machine learning model is established according to a three-dimensional information after etching. The OPC unit is configured to perform an optical proximity correction (OPC) procedure on the sub-layouts.

According to an alternate embodiment of the present invention, a training method for a layout machine learning model is provided. The training method for the layout machine learning model includes the following steps. A target layout is obtained. The target layout is decomposed into two sub-layouts, which overlap at a stitch region. Two sub-masks are obtained according to the sub-layouts. An exposure development procedure and an etching procedure are performed on a training sample according to the sub-masks. A three-dimensional information of the training sample after etching is obtained. The layout machine learning model is trained according to the target layout, a size of the stitch region and the three-dimensional information after etching.

The above and other aspects of the invention will become better understood with regard to the following detailed description of the preferred but non-limiting embodiment(s). The following description is made with reference to the accompanying drawings.

DETAILED DESCRIPTION OF THE INVENTION

As the tracing density gradually increases, the difficulty in exposure and development also increases. To overcome such difficulty, research personnel provide a double patterning technology. According to the double patterning technology, the first run of exposure, development and etching is performed using a mask, then the second run of exposure, development and etching is performed according to another mask.

Figure 1:
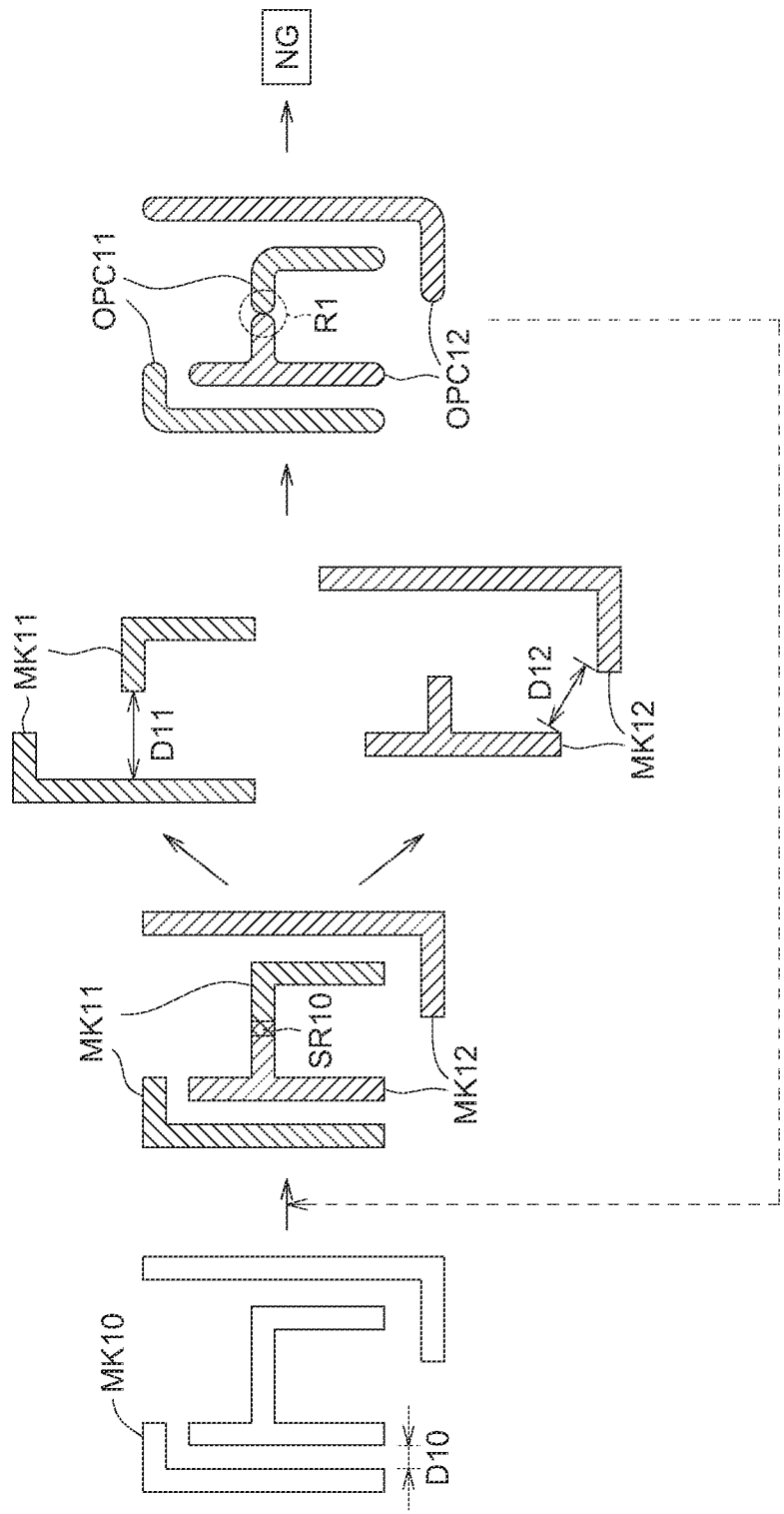
FIG. 1 is a schematic diagram illustrating the operation of double patterning.

Referring to FIG. 1, a schematic diagram illustrating the operation of double patterning is shown. The target layout MK10 is a predetermined circuit pattern. Firstly, the target layout MK10 is decomposed into sub-layouts MK11 and MK12, which overlap at a stitch region SR10. The stitch region SR10 has a predetermined size or is designed according to a predetermined rule.

As indicated in FIG. 1, the target layout MK10 has a minimum line spacing D10, the sub-layout MK11 has a minimum line spacing D11, and the sub-layout MK12 has a minimum line spacing D12. In comparison to the target layout MK10, the circuit density of the sub-layout MK11 is reduced by half, therefore the minimum line spacing D11 is significantly enlarged. In comparison to the target layout MK10, the circuit density of the sub-layout MK12 is reduced by half, therefore the minimum line spacing D12 is significantly enlarged. Thus, under the circumstance that the circuit density is increased, the exposure, development and etching actions can be easily completed.

The sub-layout MK11 can be corrected using an optical proximity correction (OPC) procedure to simulate a two-dimensional contour OPC 11 after etching. The sub-layout MK12 can be corrected using an OPC procedure to simulate a two-dimensional contour OPC 12 after etching.

As indicated in FIG. 1, the two-dimensional contours OPC 11 and OPC 12 do not intersect, therefore it can be estimated that the circuit pattern after the second run of exposure, development and etching cannot be smoothly connected at the dotted line R1, and the stitch region SR10 needs to be expanded.

Figure 2:
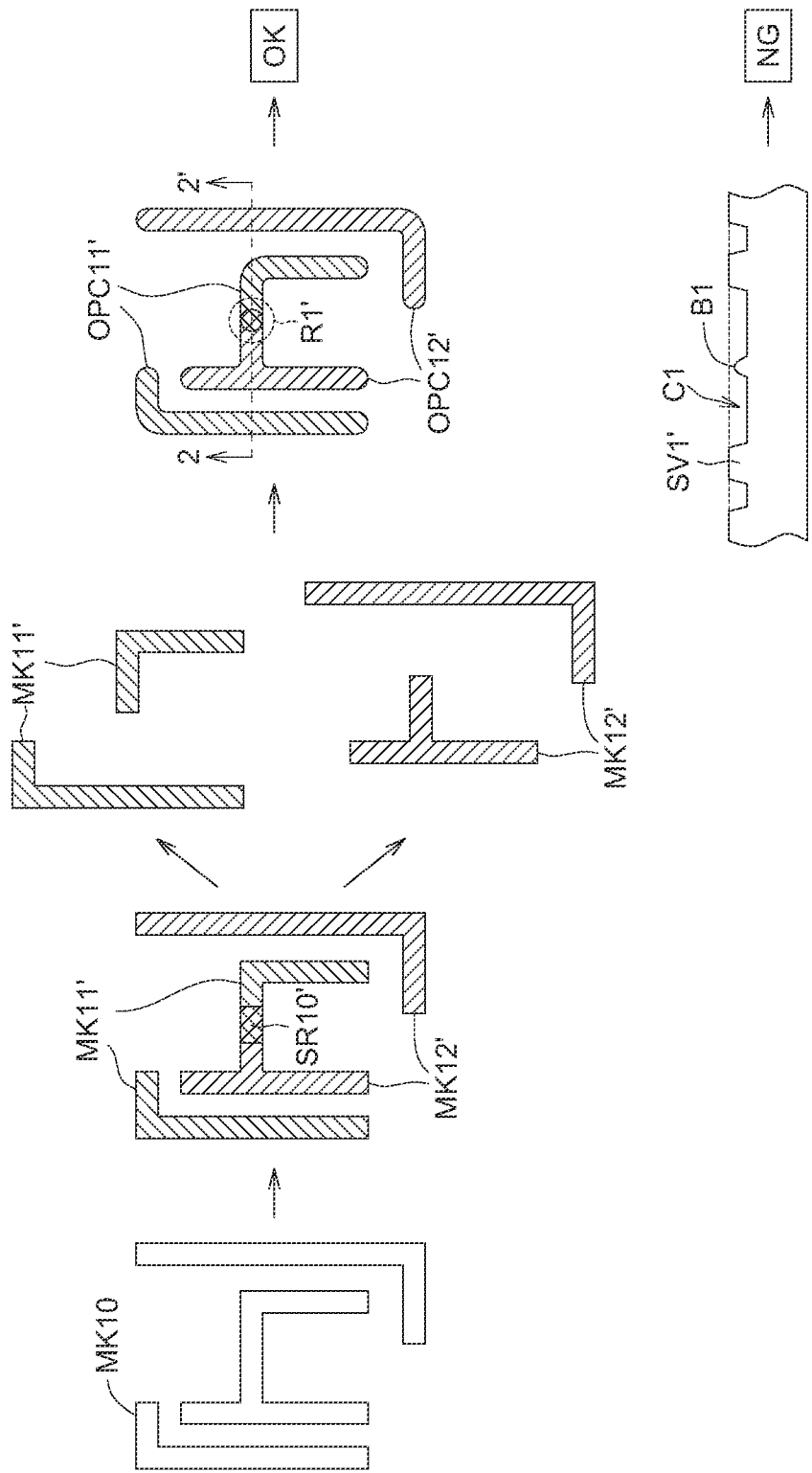
FIG. 2 is a schematic diagram of an expanded stitch region.

Referring to FIG. 2, a schematic diagram of an expanded stitch region SR10' is shown. According to the new stitch region SR10', the target layout MK10 is again decomposed into two sub-layouts MK11' and MK12', which overlap at the stitch region SR10'.

The sub-layout MK11' is corrected using the OPC procedure to simulate a two-dimensional contour OPC 11' after etching. The sub-layout MK12' is corrected using the OPC procedure to simulate a two-dimensional contour OPC 12' after etching.

As indicated in FIG. 2, the two-dimensional contours OPC 11' and OPC 12' intersect at the dotted line R1', therefore it can be concluded that the circuit pattern after the second run of exposure, development and etching will be smoothly connected at the dotted line R1'.

As indicated in FIG. 2, the three-dimensional information SV1' after etching corresponds to the cross-sectional line 2-2'. The three-dimensional information SV1' after etching contains a cross-sectional information obtained according to a scanning electron microscope (SEM). After the exposure, development and etching actions are completed, it can be found that a bump B1 corresponding to the dotted line R1' is generated. Later, when a metallic material is added to the groove C1, the metallic material on the bump B1 will be too thin and will affect the performance of conductivity.

Figure 3:
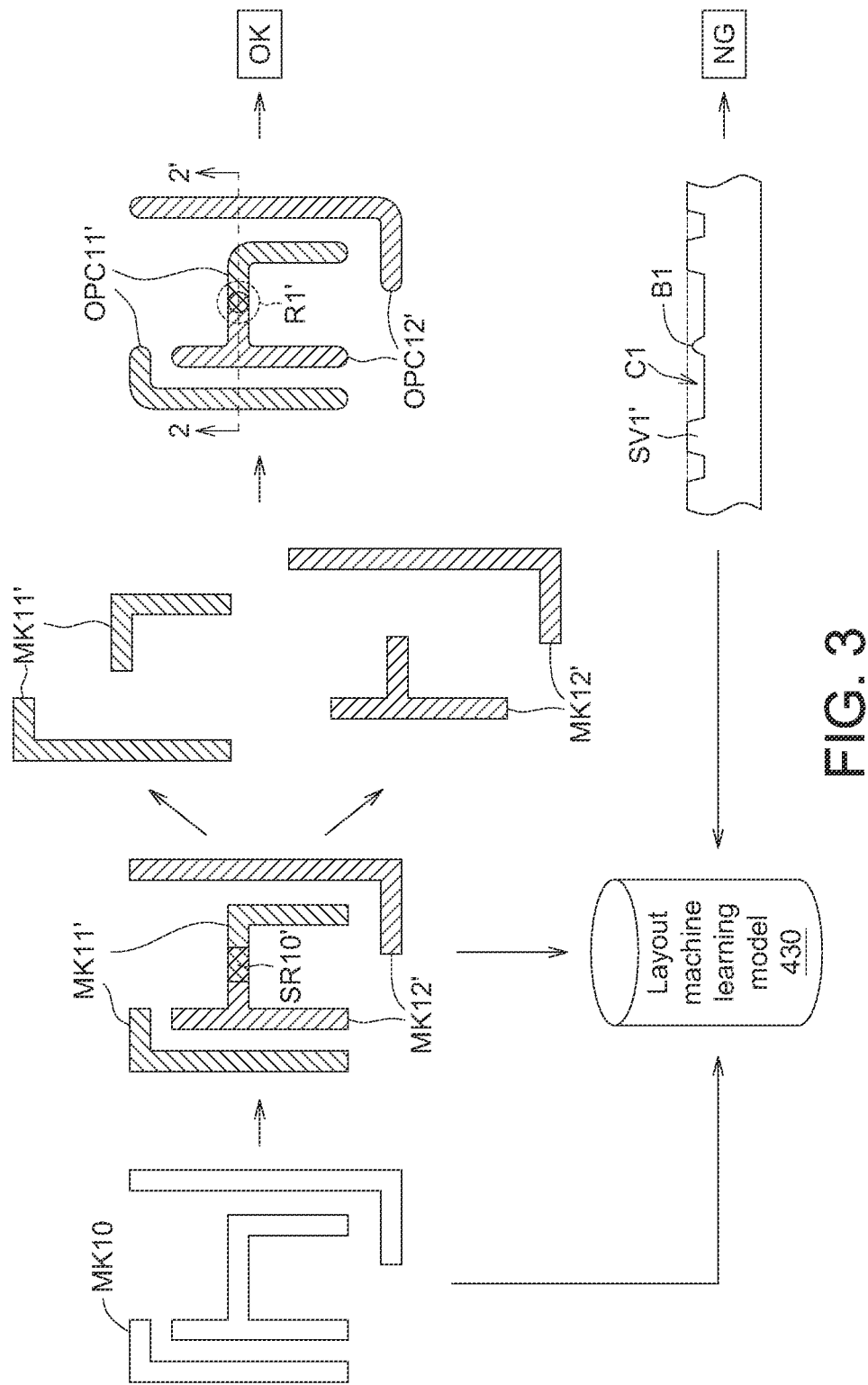
FIG. 3 is a schematic diagram illustrating a three-dimensional information after etching in the mask correction for double patterning.

Referring to FIG. 3, a schematic diagram illustrating a three-dimensional information SV1' after etching in the mask correction for double patterning is shown. As disclosed above, the intersection between the two-dimensional contours OPC 11' and OPC 12' alone does not suffice to confirm the etching quality. In the present embodiment, a layout machine learning model 430 is trained according to the target layout MK10, a size of the stitch region SR10' and the three-dimensional information after etching SV1', such that the stitch region can be set by the layout machine learning model 430 to assure the etching quality of double patterning.

Figure 4:
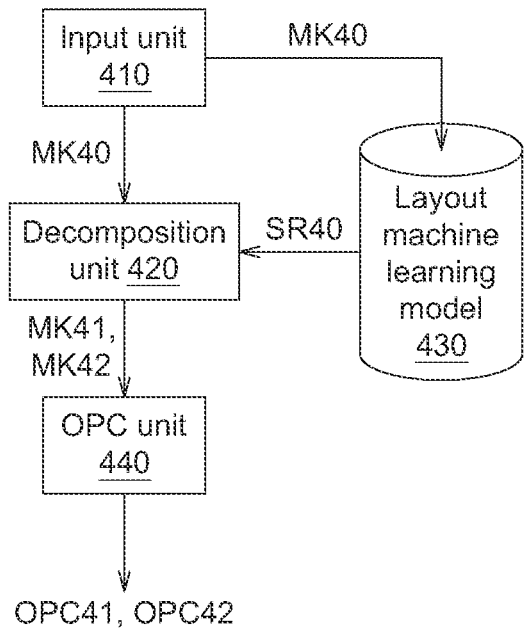
FIG. 4 is a schematic diagram of a mask correction device for double patterning according to an embodiment.

Referring to FIG. 4, a schematic diagram of a mask correction device 400 for double patterning according to an embodiment is shown. The mask correction device 400 for double patterning includes an input unit 410, a decomposition unit 420, the layout machine learning model 430 and an OPC unit 440. The functions of each element are disclosed below. The input unit 410 is used to provide a target layout MK40, such as a database, a storage device, a transmission line or a wireless network module. The decomposition unit 420 is used to decompose the target layout MK10. The layout machine learning model 430 is used to analyze the stitch region SR40 between the sub-layouts MK41 and MK42. The OPC unit 440 is used to perform an OPC procedure. The decomposition unit 420, the layout machine learning model 430 and/or the OPC unit 440 can be realized by such as a circuit, a chip, a circuit board, a code or a storage device for storing codes. The mask correction device 400 for double patterning of the present embodiment considers the three-dimensional information after etching, and therefore assures the etching quality of double patterning. Details of the operation of each of the above elements are disclosed below with an accompanying flowchart.

Figure 5:
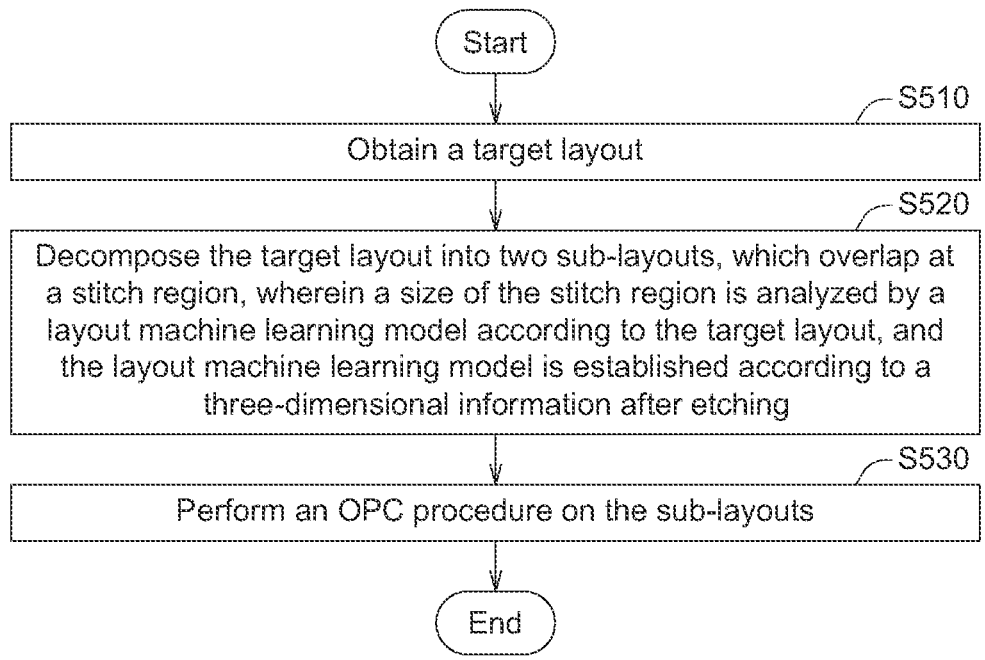
FIG. 5 is a flowchart of a mask correction method for double patterning according to an embodiment.
Figure 6:
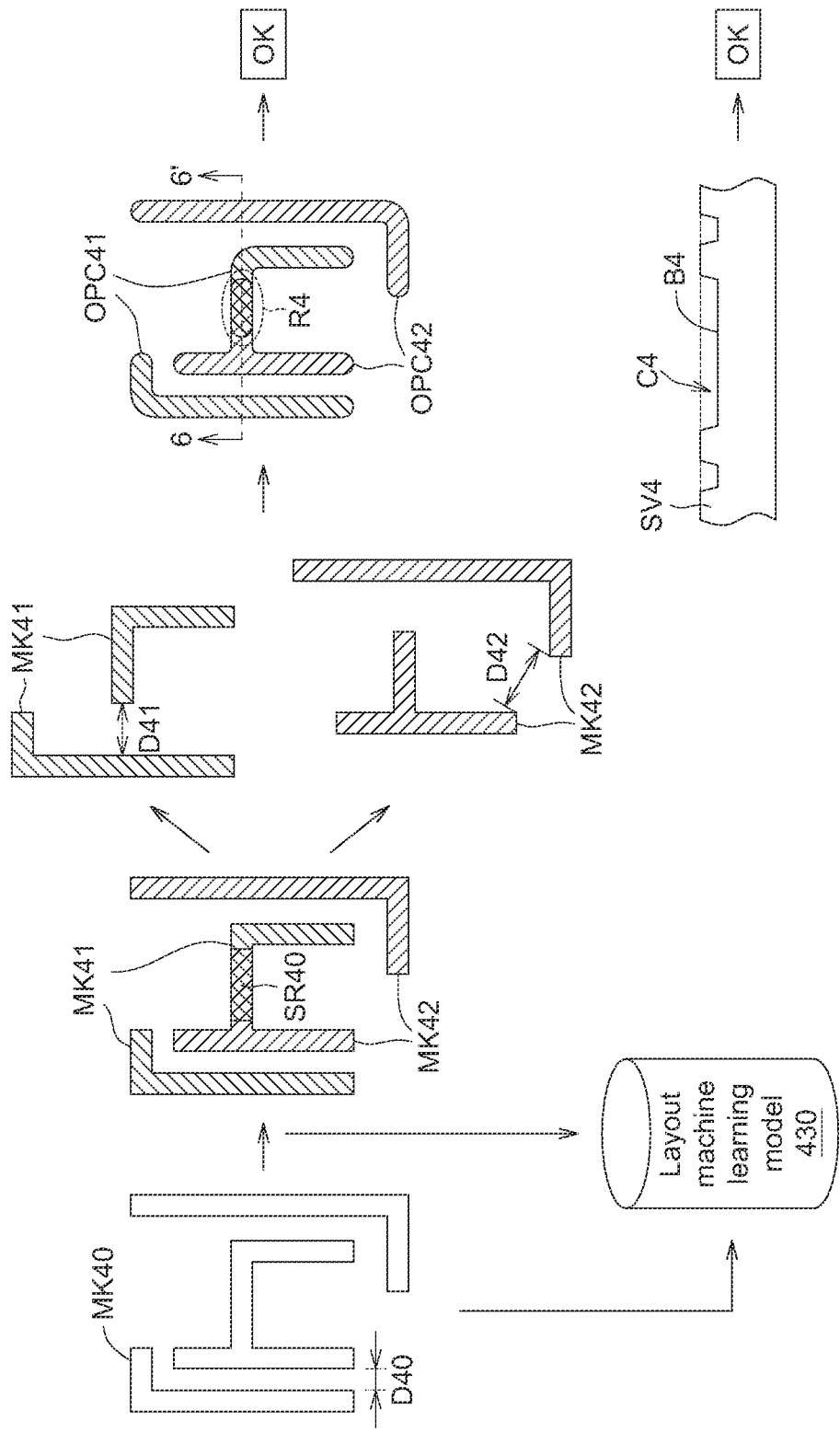
FIG. 6 is a schematic diagram illustrating each step of FIG. 5.

Refer to FIGS. 5 to 6. FIG. 5 is a flowchart of a mask correction method for double patterning according to an embodiment. FIG. 6 is a schematic diagram illustrating each step of FIG. 5. Firstly, the method begins at step S510, the target layout MK40 is obtained by the input unit 410. The target layout MK40 has a minimum line spacing D40. The minimum line spacing D40 may have been over the limit of the exposure and development technology and needs to be realized using the double patterning technology.

Then, the method proceeds to step S520, the target layout MK40 is decomposed into sub-layouts MK41 and MK42 by the decomposition unit 420, wherein the sub-layouts MK41 and MK42 overlap at the stitch region SR40. The sub-layout MK41 is a partial content of the target layout MK40 and has a lower circuit density. The sub-layout MK41 has a minimum line spacing D41. In comparison to the target layout MK40, the minimum line spacing D41 of the sub-layout MK41 is far greater than the minimum line spacing D40 of the target layout MK40 and is beneficiary to the exposure and development process.

Likewise, the sub-layout MK42 is a partial content of the target layout MK40 and has a lower circuit density. The sub-layout MK42 has a minimum line spacing D42. In comparison to the target layout MK40, the minimum line spacing D42 of the sub-layout MK42 is far greater than the minimum line spacing D40 of the target layout MK40 and is beneficiary to the exposure and development process.

In step S520, a size of the stitch region SR40 is analyzed by the layout machine learning model 430 according to the target layout MK40. As indicated in FIG. 3, the stitch region SR40 is accurately analyzed by the layout machine learning model 430. After the stitch region SR40 is accurately analyzed, the target layout MK40 can then be decomposed into the sub-layouts MK41 and MK42.

Then, the method proceeds to step S530, an OPC procedure is performed on the sub-layouts MK41 and MK42 by the optical proximity correction (OPC) unit 440 to simulate the two-dimensional contours OPC 41 and OPC 42 after etching. In the present step, the OPC unit 440 can sequentially perform the OPC procedure on the sub-layouts MK41 and MK42. Or, the OPC unit 440 can concurrently perform the OPC procedure on the sub-layouts MK41 and MK42.

As indicated in FIG. 6, the two-dimensional contours OPC 41 and OPC 42 intersect at the dotted line R4, therefore it can be concluded that the circuit pattern after second run of exposure, development and etching will be smoothly connected at the dotted line R4.

As indicated in FIG. 6, the three-dimensional information SV4 after etching corresponds to the cross-sectional line 6-6'. After the exposure, development and etching actions are completed, it can be found that a flat bottom B4 corresponding to the dotted line R4 is generated. Later, when a metallic material is added to the groove C4, the thickness of the metallic material can be maintained, and excellent performance of conductivity can be achieved.

As disclosed in above embodiments, when the layout machine learning model 430 decomposes the target layout MK40 into sub-layouts MK41 and MK42, the layout machine learning model 430 refers to the three-dimensional information after etching to assure the etching quality of double patterning.

Figure 7:
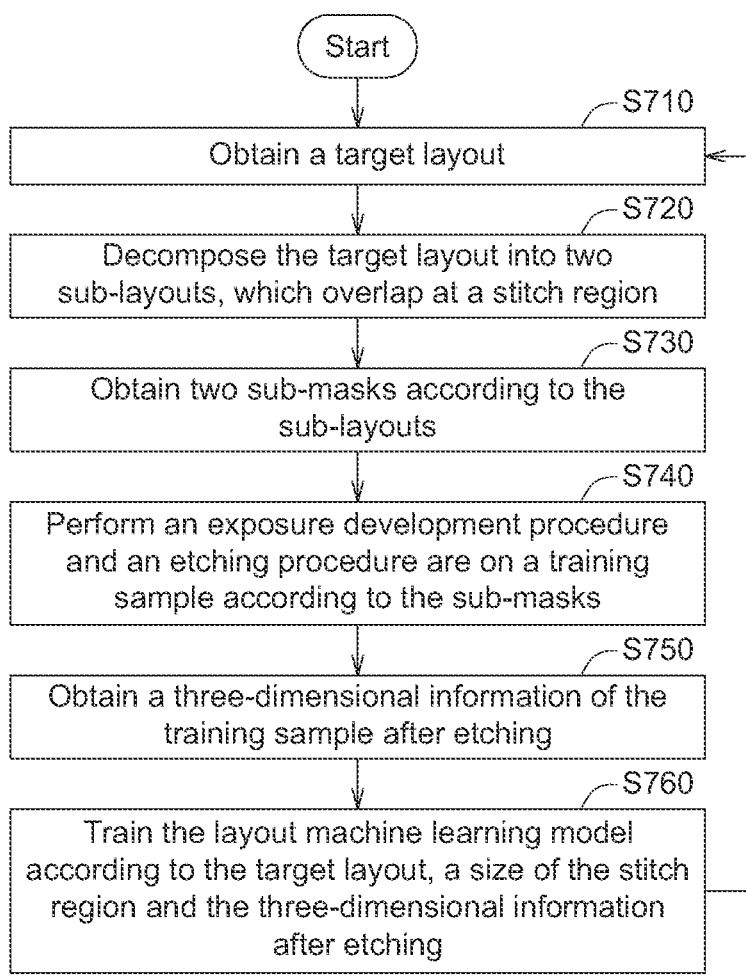
FIG. 7 is a flowchart of a training method for a layout machine learning model according to an embodiment.
Figure 8:
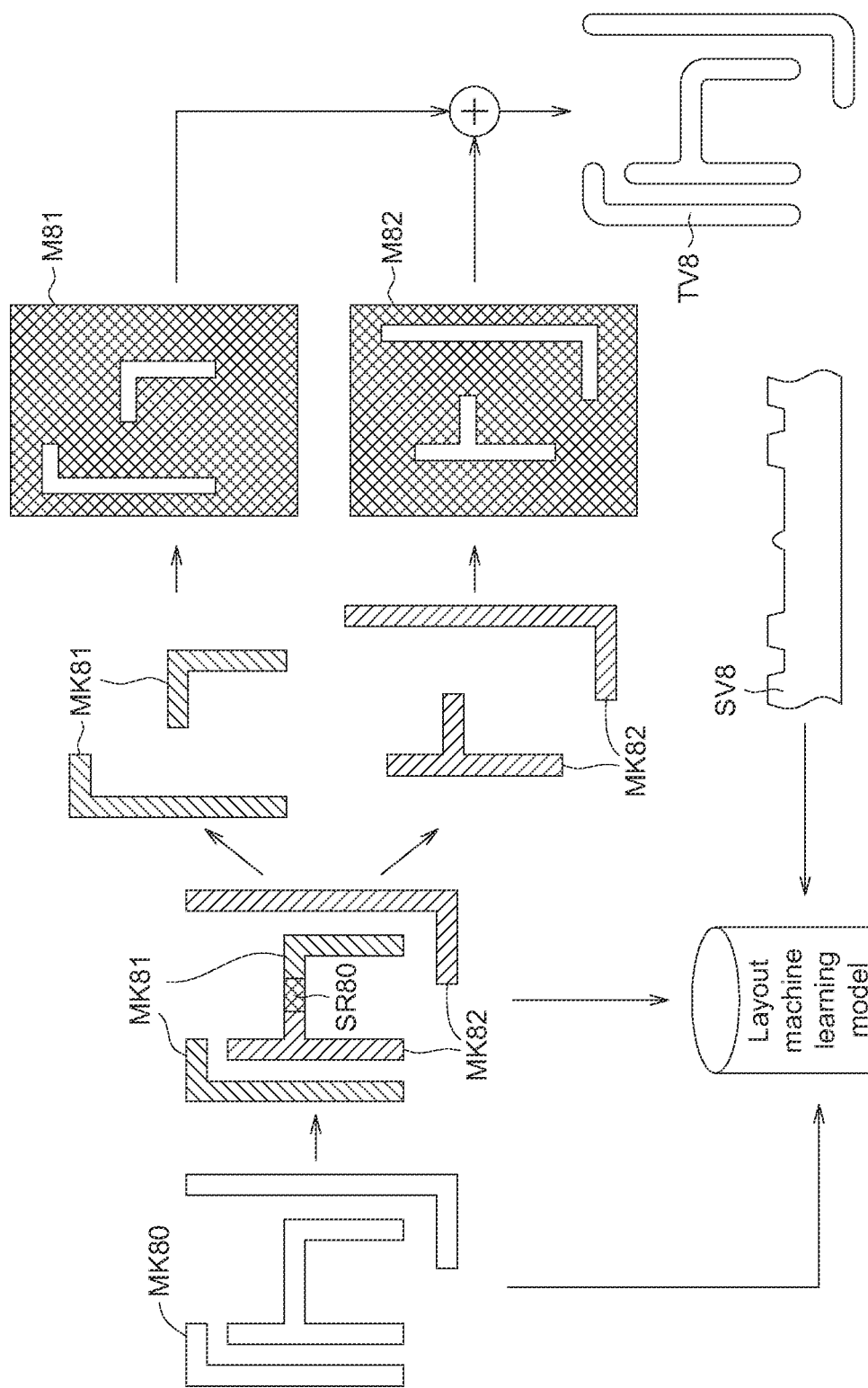
FIG. 8 is a schematic diagram illustrating each step of FIG. 7.

Details regarding how the layout machine learning model 430 is trained is disclosed below. Refer to FIGS. 7 to 8. FIG. 7 is a flowchart of a training method for a layout machine learning model according to an embodiment. FIG. 8 is a schematic diagram illustrating each step of FIG. 7. Firstly, the method begins at step S710 as indicated in FIG. 8, a target layout MK80 is obtained.

Then, the method proceeds to step S720, as indicated in FIG. 8, a target layout MK80 is decomposed into sub-layouts MK81 and MK82, which overlap at the stitch region SR80. The stitch region SR80 can be set according to a predetermined rule, manually set or obtained by the layout machine learning model 430.

Then, the method proceeds to step S730, as indicated in FIG. 8, the sub-masks M81 and M82 are obtained according to the sub-layouts MK81 and MK82.

Then, the method proceeds to step S740, an exposure development procedure and an etching procedure are performed on a training sample according to the sub-masks M81 and M82. In the present step, a 2P2E process is used, that is, after the first run of development procedure and the first run of the etching procedure are performed according to the sub-mask M81, the second run of development procedure and the second run of etching procedure are performed according to the sub-mask M82. As indicated in FIG. 8, after all exposure development procedures and etching procedures are performed, a top view of the two-dimensional information TV8 of the training sample is obtained.

Then, the method proceeds to step S750, a three-dimensional information of the training sample SV8 after etching is obtained. The three-dimensional information SV8 after etching is obtained according to a scanning electron microscope.

Then, the method proceeds to step S760, the layout machine learning model 430 is trained according to the target layout MK80, a size of the stitch region SR80 and the three-dimensional information SV8 after etching.

As disclosed in above embodiments, the layout machine learning model 430 is established according to the three-dimensional information SV8 after etching. The three-dimensional information SV8 after etching includes the top-view of the two-dimensional information TV8 as well as the information of the cross section, such that the stitch region can be set more accurately.

While the invention has been described by way of example and in terms of the preferred embodiment(s), it is to be understood that the invention is not limited thereto. On the contrary, it is intended to cover various modifications and similar arrangements and procedures, and a scope of the appended claims therefore should be accorded the broadest interpretation so as to encompass all such modifications and similar arrangements and procedures.

What is claimed is:

1. A mask correction method for double patterning, comprising:
    obtaining a target layout;
    decomposing the target layout into two sub-layouts, which overlap at a stitch region, wherein a size of the stitch region is analyzed by a layout machine learning model according to the target layout, and the layout machine learning model is established according to a three-dimensional information after etching; and
    performing an optical proximity correction (OPC) procedure on the sub-layouts.

2. The mask correction method for double patterning according to claim 1, wherein the three-dimensional information after etching is obtained according to a scanning electron microscope.

3. The mask correction method for double patterning according to claim 1, wherein the three-dimensional information after etching contains a cross-sectional information.

4. The mask correction method for double patterning according to claim 1, wherein in the step of performing the OPC procedure on the sub-layouts, the sub-layouts are subsequently processed with the OPC procedure.

5. The mask correction method for double patterning according to claim 1, wherein in the step of performing the OPC procedure on the sub-layouts, the sub-layouts are concurrently processed with the OPC procedure.

6. A mask correction device for double patterning, comprising:
    an input unit configured to obtain a target layout;
    a decomposition unit configured to decompose the target layout into two sub-layouts, which overlap at a stitch region;
    a layout machine learning model configured to analyze a size of the stitch region according to the target layout, wherein the layout machine learning model is established according to a three-dimensional information after etching; and
    an OPC unit configured to perform an OPC procedure on the sub-layouts.

7. The mask correction device for double patterning according to claim 6, wherein the three-dimensional information after etching is obtained according to a scanning electron microscope.

8. The mask correction device for double patterning according to claim 6, wherein the three-dimensional information after etching contains a cross-sectional information.

9. The mask correction device for double patterning according to claim 6, wherein the OPC unit sequentially performs the OPC procedure on the sub-layouts.

10. The mask correction device for double patterning according to claim 6, wherein the OPC unit concurrently performs the OPC procedure on the sub-layouts.

11. A training method for a layout machine learning model, comprising:
    obtaining a target layout;
    decomposing the target layout into two sub-layouts, which overlap at a stitch region;
    obtaining two sub-masks according to the sub-layouts;
    performing an exposure development procedure and an etching procedure on a training sample according to the sub-masks;
    obtaining a three-dimensional information of the training sample after etching; and
    training the layout machine learning model according to the target layout, a size of the stitch region and the three-dimensional information after etching.

12. The training method for the layout machine learning model according to claim 11, wherein the three-dimensional information after etching is obtained according to a scanning electron microscope.

13. The training method for the layout machine learning model according to claim 11, wherein the three-dimensional information after etching contains a cross-sectional information.

* * * * *